(12) United States Patent
Nakano et al.

(10) Patent No.: US 6,785,121 B2
(45) Date of Patent: Aug. 31, 2004

(54) MULTILAYER CERAMIC CAPACITOR AND PRODUCTION METHOD THEREOF

(75) Inventors: Yukie Nakano, Tokyo (JP); Shunichi Yuri, Tokyo (JP); Mari Miyauchi, Tokyo (JP); Daisuke Iwanaga, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/865,575

(22) Filed: May 29, 2001

(65) Prior Publication Data

US 2002/0075632 A1 Jun. 20, 2002

(30) Foreign Application Priority Data

May 30, 2000 (JP) .................................. 2000-159511
Jan. 30, 2001 (JP) .................................. 2001-021558

(51) Int. Cl.[7] .............................. H01G 4/06; H01G 4/20
(52) U.S. Cl. ........................ 361/321.2; 361/301.4; 361/312
(58) Field of Search ................. 361/301.4, 306.3, 361/309, 311–313, 320, 321.1–321.5

(56) References Cited

U.S. PATENT DOCUMENTS

| | | | | |
|---|---|---|---|---|
| 4,651,750 A | * | 3/1987 | Northeved ............... 128/903 |
| 5,134,540 A | * | 7/1992 | Rutt ........................... 264/615 |
| 5,319,517 A | * | 6/1994 | Nomura et al. ......... 252/519.12 |
| 5,977,006 A | * | 11/1999 | Iguchi et al. ............... 501/137 |
| 6,034,864 A | * | 3/2000 | Naito et al. ............... 361/306.1 |
| 6,205,014 B1 | * | 3/2001 | Inomata et al. ............. 361/312 |
| 2001/0055193 A1 | * | 12/2001 | Chazono et al. ............ 361/311 |

FOREIGN PATENT DOCUMENTS

| | | |
|---|---|---|
| JP | A 5-62855 | 3/1993 |
| JP | A 05-290625 | 11/1993 |
| JP | A 06-045182 | 2/1994 |
| JP | A 06-084692 | 3/1994 |
| JP | A 9-35985 | 2/1997 |
| JP | A 11-103022 | 4/1999 |
| JP | A 11-297561 | 10/1999 |
| JP | A 11-317322 | 11/1999 |

* cited by examiner

*Primary Examiner*—Dean A. Reichard
*Assistant Examiner*—Eric Thomas
(74) *Attorney, Agent, or Firm*—Oliff & Berridge, PLC

(57) ABSTRACT

A multilayer ceramic capacitor having internal electrode layers and dielectric layers with dielectric particles is disclosed. An average particle diameter of the dielectric particles, when measured parallel with the direction of the internal electrode layers, is larger than a thickness of the dielectric layer. A ratio (R/d) between the average particle diameter (R) and the thickness (d) of the dielectric layer is $1 < R/d < 3$.

9 Claims, 2 Drawing Sheets

MULTILAYER CERAMIC CAPACITOR AND PRODUCTION METHOD THEREOF

BACKGROUND OF THE INVENTION

1. Field of the Invention

The present invention relates to a multilayer ceramic capacitor, and particularly relates to a multilayer ceramic capacitor having a large capacitance, large capacitance even in a compact size, and high reliability.

2. Description of the Related Art

A gain capacitance of a multilayer ceramic capacitor is in a relationship of a formula (1) below.

$$C = \epsilon_0 \cdot \epsilon_r \times n \times S/d \tag{1}$$

(C: capacitance (F), $\epsilon_0$: vacuum permittivity, $\epsilon_r$: specific permittivity of dielectric material, n: number of layers, S: valid area, d: thickness of dielectric)

Accordingly, in order to increase capacitance, there are methods of making the dielectric layer thickness d thinner, increasing the specific permittivity $\epsilon_r$, increasing the valid area S and increasing the number n of dielectric layers.

However, since there is a limit in increasing the valid area to obtain a large capacitance in a compact size, a method of increasing the permittivity or making the layer thinner is generally used.

Owing to the problem of unevenness of tickness, there has been said that the limit of a thinner dielectric layer was 10 $\mu$m or 5 $\mu$m, but a product having a thinner layer than the limit has come to be produced due to development of production techniques.

Even if a chip capacitor of an extremely thin layer wherein the dielectric thickness is 3 $\mu$m or less can be produced, however, there arises a disadvantage that it cannot stand a practical use because resistance of the dielectric is too low. Therefore, a method of making a dielectric particle diameter between internal electrodes less than the thickness of a dielectric layer and making the number of dielectric particles between the electrodes two or more has been taken in the related art. It is for placing a grain boundary phase and securing insulation resistance by making the number of dielectric particles between electrodes two or more. Note that the state that the number of dielectrics between electrodes is two or more means that a straight line drawn vertically from one internal electrode to an internal electrode next to it passes through two or more particles.

However, when the layer becomes still thinner and the dielectric thickness becomes 3 $\mu$m or less, it is necessary to make the particle diameter 1.5 $\mu$m or less in order to make the dielectric particles between the internal electrodes two or more, so there has been a disadvantage that the gain capacitance cannot be made larger.

Thus, capacitance per volume inevitably becomes small and that has been an obstacle of attaining a compact size and larger capacitance.

Note that, as described in the Japanese Unexamined Patent Publication No. 11-317322, a capacitor wherein a particle diameter of about 20% or more of dielectric particles constituting the dielectric layer of the multilayer ceramic capacitor have a substantially same thickness as that of the dielectric layer has been proposed. This publication discloses improvement of the CR product, which is a product of the capacitance and resistance of the capacitor, by applying such a configuration.

This publication, however, only discloses multilayer ceramic capacitors wherein an average particle diameter of the dielectric particles is same or less than the thickness of the dielectric layer.

SUMMARY OF THE INVENTION

The present invention has been made in consideration with the above disadvantages of the related arts and has an object to provide a highly reliable multilayer ceramic capacitor having further improved capacitance per a unit volume and a large capacitance even in a compact size.

To attain the above object, according to the present invention, there is provided a multilayer ceramic capacitor comprising internal electrode layers and dielectric layers, wherein an average particle diameter (R), in a direction parallel with the internal electrode layers, in dielectric particles constituting the dielectric layers is larger than a thickness of the dielectric layer (d). Note that the average particle diameter of the dielectric particles in the dielectric layers means an average particle diameter of the dielectric particles in the valid dielectric layer (which contribute to the capacitance) between a pair of internal electrode layers. The average particle diameter is an average not including dielectric particles in a dielectric layer of which parts do not contribute to the capacitance (for example, a dielectric layer arranged on an outer side of the dielectric layer in the stacking direction not sandwiched by the internal electrode layers).

Preferably, a ratio (R/d) of the average particle diameter (R) and the thickness (d) of the dielectric layer satisfies 1<R/d<3.

Preferably, a main component of the internal electrode layers is Ni or Cu. In this case, Fe is preferably segregated in the internal electrode layers.

In the present invention, a multilayer ceramic capacitor of particularly high reliability can be obtained even if the thickness of the dielectric layer is less than 3 $\mu$m.

In the present invention, a dielectric layer comprises at least the dielectric particle and a grain boundary phase. An area ratio of the grain boundary phase on a section of the dielectric layer is preferably 2% or less.

The dielectric particle may have, for example, a core-shell structure.

In the present invention, preferably, the dielectric layer is comprised of dielectric particles, a grain boundary and grain boundary phase, a segregation phase (second phase) exists in the grain boundary phase, and the segregation phase contains at least two kinds of elements selected from Mn, Y, Si, Ca, V and W.

According to the present invention, there is provided a production method of a multilayer ceramic capacitor, comprising the steps of firing a green chip to be a capacitor element body comprising dielectric layers and internal electrode layers in a reducing atmosphere; and performing heat processing under an atmosphere of which oxygen partial pressure is higher than the reducing atmosphere; wherein an average particle diameter (R) in a direction parallel with the internal electrode layers in dielectric particles constituting the dielectric layer is made to be larger than a thickness (d) of the dielectric layer.

Preferably, a temperature of heat processing after firing under the reducing atmosphere is 1000° C. or more. Also, an oxygen partial pressure at the time of heat processing after firing under the reducing atmosphere is preferably $10^{-3}$ Pa to 1 Pa.

Note that in the present invention, the average particle diameter is defined as below. Namely, when the multilayer ceramic capacitor is cut at a section which is vertical with respect to the internal electrodes and passes both of the external electrodes, a straight line which is substantially parallel with the internal electrode layer is drawn at a center portion between the internal electrodes on this cut section, and when assuming that the number of particles crossing with this line is n (n is 10 or more), and a length of the line is L, L/n is the average particle diameter (R) in the direction horizontal to the internal electrodes.

In the present invention, due to the dielectric layer having the above configuration, a highly reliable multilayer ceramic capacitor having large capacitance per a unit volume and a large capacitance even in a compact size can be realized.

Also, in the present invention, even if the thickness of the dielectric layer is less than 3 μm, it is possible to obtain capacitance of a high volume ratio of 100 F/m$^3$ or more by obtaining the configuration wherein the largest particle diameter of particles is larger than a distance between the electrodes. This particle diameter can be realized by adjusting a dielectric composition, firing temperature and firing atmosphere. Also, sufficient insulation resistance can be obtained by performing heat processing under an optimal oxygen partial pressure after firing in a reducing atmosphere, so the reliability improves.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Multilayer Ceramic Capacitor

Figure 1:
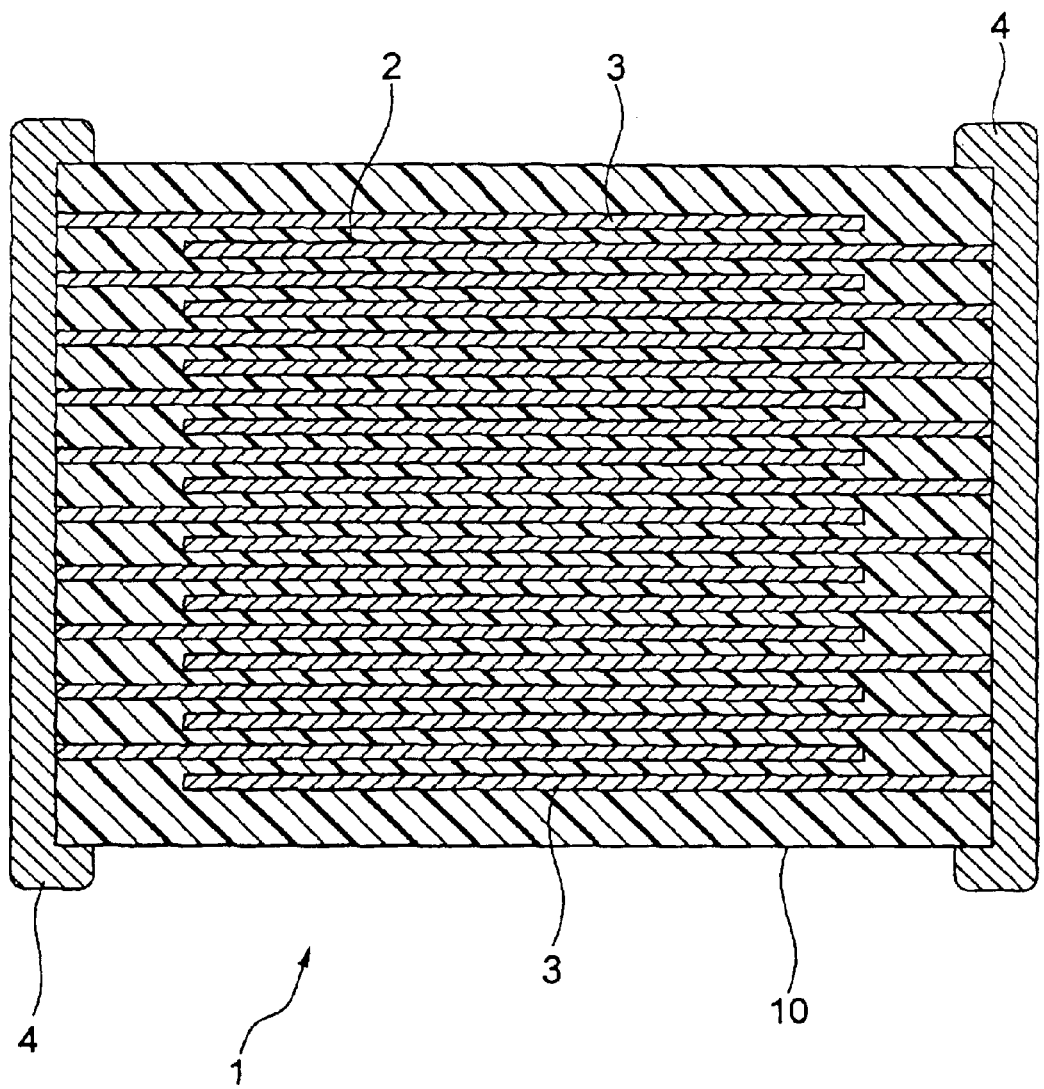
FIG. 1 is a schematic sectional view of a multilayer ceramic capacitor according to an embodiment of the present invention.

As shown in FIG. 1, a multilayer ceramic capacitor 1 according to an embodiment of the present invention comprises a capacitor element body 10 wherein dielectric layers 2 and internal electrode layers 3 are alternately stacked. On the both end portions of the capacitor element body 10 are formed a pair of external electrodes 4 respectively connected to the internal electrode layers 3 alternately arranged inside the element body 10. A shape of the capacitor element body 10 is not particularly limited, but is normally a rectangular parallelepiped. Also a size thereof is not particularly limited and may be a suitable size in accordance with use, but is normally about (0.6 to 5.6 mm)×(0.3 to 5.0 mm)×(0.3 to 1.9 mm).

The internal electrode layers 3 are stacked so that the respective end surfaces are alternately exposed to surfaces of facing two end portions of the capacitor element body 10. The pair of external electrodes 4 are formed on the both end portions of the capacitor element body 10 and connected to the exposed end surfaces of the alternately arranged internal electrode layers 3 in order to configure a capacitor circuit.

Dielectric Layer 2

The composition of the dielectric layer 2 is not particularly limited in the present invention, but for example composed of a dielectric ceramic composition below.

A dielectric ceramic composition of the present embodiment contains, for example, a main component expressed by $\{(Ba_{(1-x-y)}Ca_x Sr_y) O\}_A (Ti_{(1-z)}Zr_z)_B O_2$. Note that A, B, x, y and z are in any range but preferably, for example, $0.990 \leq A/B \leq 1.010$, $0 \leq x \leq 0.80$, $0 \leq y \leq 0.5$, $0.01 \leq z \leq 0.98$. As subcomponents contained together with the main component in the dielectric ceramic composition, a subcomponent containing at least one kind selected from oxides of Y, Gd, Tb, Dy, V, Mo, Zn, Cd, Sn, W, Ca, Mn, Si and P can be mentioned as an example.

By adding the subcomponent, a low temperature firing becomes possible without declining dielectric characteristics of the main component, deficiency in reliability at the time of making the dielectric layer thinner can be reduced and a longer durability can be attained. Note that in the present invention, the composition of the dielectric layer is not limited to the above.

Note that the conditions of the number and thickness, etc. of layers of the dielectric layer 2 shown in FIG. 1 may be suitably decided in accordance with an object and use, but according to the present embodiment, the thickness of the dielectric layer is 6 μm or less, preferably 3 μm or less, further preferably less than 2 μm.

Figure 2:
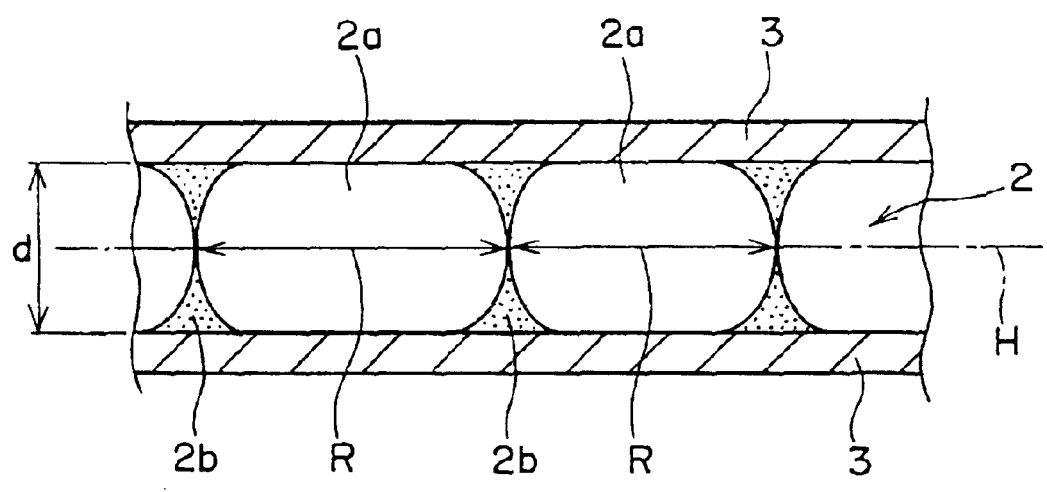
FIG. 2 is an enlarged sectional view of a key portion of a dielectric layer shown in FIG. 1.

As shown in FIG. 2, the dielectric layer 2 comprises at least dielectric particles 2a and a grain boundary phase 2b. The area ratio of the grain boundary phase 2b on the section of the dielectric layer 2 is preferably 2% or less. The dielectric particle 2a, for example, has a core-shell structure. The grain boundary phase has its components oxides of a material constituting dielectric materials or internal electrode materials, oxides of separately added materials, and furthermore, oxides of materials to be mixed as impurities during the processing. The grain boundary phase 2b contains at least two kinds of segregated substances (segregated phase (a second phase)) selected from Mn, Y, Si, Ca, V and W.

In the present embodiment, an average particle diameter R in the direction H which is parallel with the internal electrode layers 3 in the dielectric particles 2a constituting the dielectric layer 2 is larger than the dielectric layer thickness d, and the ratio (R/d) between the average particle diameter R and the dielectric layer thickness d is preferably 1<R/d<3. Note that the larger the ratio of the average particles diameter R with respect to the dielectric layer thickness d, the larger the gain capacitance. However, there is a tendency that a thickness of one grain boundary becomes thick and a capacitance declines when R/d>3, thus, it is preferably 1<R/d<3.

Note that the average particle diameter of the dielectric particles 2a in the dielectric layer 2 means an average particle diameter of the dielectric particles 2a in the dielectric layers 2 (which contribute to the capacitance) sandwiched between the internal electrode layers 3. The average particle diameter is an average not containing dielectric particles in the dielectric layer of which parts do not contribute to the capacitance (for example, a dielectric layer arranged on an outer side in the stacking direction of the dielectric layer 2a not sandwiched between the internal electrode layers 3). The dielectric particles 2a contact both of the pair of internal electrode layers 3 sandwiching the dielectric particles 2a.

Note that the average particle diameter R is defined as below. Namely, when assuming that a straight line H which is substantially parallel with the internal electrode layer is drawn at a center portion of the internal electrodes 3 on the cut section shown in FIG. 2, the number of particles crossing with this line is n (n is 10 or more), and a length of the line is L, L/n is the average particle diameter (R) in the direction horizontal to the internal electrodes 3.

Internal Electrode Layer 3

A conductive material contained in the internal electrode layer 3 is not particularly limited, but since the material composing the dielectric layer 2 has reduction resistance characteristics, a base metal can be used. As a base metal used as a conductive material, Ni, Cu, Ni alloy or Cu alloy is preferable. When a main component of the internal electrode layer 3 is Ni, a method of firing in a low oxygen partial pressure (reducing atmosphere) is taken so as not to reduce the dielectric. On the other hand, a method of making the composition ratio a little different from the stoichiometric composition so as not to reduce the dielectric.

The thickness of the internal electrode layer 3 may be suitably determined in accordance with a use, but is normally 0.5 to 5 μm, in particularly, about 1 to 2.5 μm.

External Electrode 4

A conductive material contained in the external electrode 4 is not particularly limited, but Cu, Cu alloy, Ni, or Ni alloy, etc. is normally used. Note that of course Ag, Ag—Pd alloy, etc. can be used. Inexpensive Ni, Cu or alloys of these is used in the present embodiment.

The thickness of the external electrode may be suitably decided in accordance with a use, etc., but is normally preferable that about 10 to 50 μm.

Production Method of Multilayer Ceramic Capacitor

Next, a method of producing a multilayer ceramic capacitor according to an embodiment of the present invention will be explained.

In the present embodiment, it is produced by preparing green chips by a normal print method or sheet method using a paste and firing the same, then, printing or transferring thereon an external electrode. A specific explanation will be made on the production method below.

The paste for dielectric layer may be an organic-based paint obtained by mixing a dielectric material and organic vehicle, or a water-based paint.

As the dielectric material, materials constituting the main component, materials constituting the subcomponent and materials constituting sintering aids in accordance with need are used in accordance with the composition of the dielectric ceramic composition explained above. As materials constituting the main component, oxides of Ti, Ba, Sr, Ca, Zr and/or a compound which become the oxide by firing are used. As the material constituting the subcomponent, a single oxide or composite oxide of at least one kind, preferably three kinds or more selected from oxides of Sr, Y, Gd, Tb, Dy, V, Mo, Zn, Cd, Ti, Ca, Sn, W, Mn, Si and P and/or a compound which becomes the oxide by firing is used.

In the production method according to the present invention, sintering aids are not necessarily contained, but in the case of containing the same, for example, oxides of Si or Li and/or a compound which becomes the oxide by firing is used. As the compound which becomes the oxide by firing, for example, carbonate, nitrate, oxalate, organic metal compounds, etc. may be mentioned. Of course the oxide and compound which becomes the oxide by firing may be used together.

For powders of these materials, those having an average particle diameter of about 0.005 to 5 μm is normally used. A dielectric material can be obtained from the material powders, for example, by conducting as described below.

First, starting materials are combined to have a predetermined amount ratio and wet-mixing is conducted, for example, by using a ball-mill, etc. Next, it is dried by a spray dryer, etc., then, calcined, and the dielectric oxide of the above formula constituting the main component is obtained. Note that the calcination is performed normally at 500 to 1300° C., preferably at 500 to 1000° C. and more preferably at 800 to 1000° C. for about 2 to 10 hours in an air. Next, it is grinded to have a predetermined particle diameter by a jet-mill or ball-mill, etc. to obtain the dielectric material. The subcomponent and sintering aids ($SiO_2$ or $Li_2O$, etc.) are respectively calcined separately from the main component and mixed into the obtained dielectric material. If the subcomponent is calcined together with the calcination of the main component, desired characteristics cannot be obtained.

Additives, such as binders, plasticizers, dispersants, solvents, etc. used at the time of adjusting the dielectric layer paste may be various. Also, glass frit may be added to the dielectric layer paste. As the binder, ethyl cellulose, abietic acid resin, polyvinyl butyral, etc. may be mentioned, as the plasticizer, for example, abietic acid derivative, diethyl oxalate, polyethylene glycol, polyalkylene glycol, phthalic acid ester, phthalic acid dibutyl, etc., as the dispersant, for example, glycerin, octadecylamine, trichloroacetic acid, oleic acid, octadiene, oleic acid ethyl, mono oleic acid glycerin, tri oleic acid glycerin, tristearic acid glycerin, mencedene oil, etc., and as the solvent, for example, toluene, terpineol, butyl carbitol, methylethylketone, etc. may be mentioned. When firing the paste, it is made that the dielectric material accounts for about 50 to 80 wt % in the whole paste, the binder accounts for 2 to 5 wt %, the plasticizer accounts for 0.01 to 5 wt %, the dispersant accounts for 0.01 to 5 wt %, and the solvent accounts for about 20 to 50 wt %. The above dielectric materials are mixed with the solvent, etc., and kneaded, for example, by using a triple-roll, etc. to be a paste (slurry).

Note that when making the dielectric layer paste a water-based paint, it is sufficient to knead the dielectric materials and the water-based vehicle obtained by dissolving water-soluble binder, dispersants etc. in water. The water-soluble binder used for water-based vehicle is not particularly limited, but polyvinyl alcohol, cellulose, water-soluble acrylic resin, etc. may be used.

The internal electrode paste is prepared by kneading conductive materials comprised of a variety of conductive metals and alloys, a variety of oxides which becomes the above conductive materials after firing, organic metal compounds, resinate, etc. with organic vehicle.

As the conductive material used at the time of preparing the internal electrode paste, Ni, Ni alloy, furthermore, mixture of these are used. Such conductive materials are sphere shaped, scale shaped, etc. and the shape is not particularly limited and may be mixture of these shapes. Also, the conductive materials having the average particle diameter of about 0.1 to 10 μm, preferably about 0.2 to 1 μm may be normally used.

The organic vehicle contains a binder and solvent. As the binder, any of well-known ones can be used, for example, ethyl cellulose, acrylic resin, butyral resin, etc. A content of the binder is made to be about 1 to 5 wt %. As the solvent, any of well-known ones can be used, for example, terpionel, butyl carbitol, kerosene, etc. A content of the solvent is made to be about 20 to 55 wt % with respect to the whole paste.

Thus obtained internal electrode layer paste and the dielectric layer paste are alternately stacked by using a printing method, transfer method, green sheet method, etc. When using the printing method, the dielectric layer paste and the internal electrode layer paste are successively printed on a PET or other substrate, cut into a predetermined shape, then, peeled from the substrate to form a stacked body. While, when using the sheet method, the dielectric layer paste is used to form a green sheet (dielectric layer before firing), and an internal electrode pattern (internal electrode layer before firing) comprised of the internal electrode layer paste is printed thereon.

A large number of the green sheets being printed the internal electrode pattern thereon are stacked in the stacking direction to form a stacked body. On the uppermost end and the lowermost end thereof in the stacking direction are also stacked a plurality of green sheets on which the internal electrode pattern is not printed.

Next, thus obtained stacked body is cut into a predetermined size of the stacked body to form a green chip, then, binder removal processing and firing are performed. Heat processing is then performed to re-oxidize the dielectric layer 2.

The binder removal processing may be performed under normal conditions, but if Ni, Ni alloy or other base metal is used for the conductive material of the internal electrode layers, the processing is preferably performed under the following conditions.

Rate of temperature rise: 5 to 300° C./hour, in particular 10 to 50° C./hour

Holding temperature: 200 to 400° C., in particular 250 to 350° C.

Temperature holding time: 0.5 to 20 hours, in particular 1 to 10 hours

Atmosphere: in a wet mixed gas of $N_2$ and $H_2$

Firing is preferably performed under the conditions below.

Rate of temperature rise: 50 to 500° C./hour, in particular 200 to 300° C./hour

Holding temperature: 1100 to 1300° C., in particular 1150 to 1250° C.

Temperature holding time: 0.5 to 8 hours, in particular 1 to 3 hours

Cooling rate: 50 to 500° C./hour, in particular 200 to 300° C./hour

Atmospheric gas: a wet mixed gas of $N_2$ and $H_2$, etc.

Note that the oxygen partial pressure in the air atmosphere is preferably $10^{-2}$ Pa or less, in particular $10^{-2}$ to $10^{-8}$ Pa. When exceeding the above range, the internal electrode layer is liable to be oxidized, while when the oxygen partial pressure is too low, the electrode material of the internal electrode layer is liable to result in abnormal sintering and break off.

The heat processing after the above firing is preferably performed by setting the holding temperature or the highest temperature preferably at 1000° C. or more, in particular 1000 to 1100° C. If the holding temperature or the highest temperature during the heat processing is less than the above range, oxidization of the dielectric material becomes insufficient so the insulation resistance lifetime tends to become short. On the other hand, when the holding temperature exceeds the above range, Ni of the internal electrode is oxidized and not only do capacitance fall, but also the internal electrode layers end up reacting with the dielectric material resulting in a tendency toward a fall in the lifetime. The oxygen partial pressure at the time of the heat processing is higher than the reducing atmosphere at the time of firing and preferably is $10^{-3}$ Pa to 1 Pa, more preferably, $10^{-2}$ pa to 1 Pa. When the oxygen partial pressure is less than the above range, reoxidization of the dielectric layer 2 is difficult, while when over that range, the internal electrode layer 3 tends to oxidize. Other heat processing conditions are preferably as below.

Temperature holding time: 0 to 6 hours, in particular 2 to 5 hours

Cooling rate: 50 to 500° C./hour, in particular 100 to 300° C./hour

Atmospheric gas: wet $N_2$ gas, etc.

Note that, for example, a wetter, etc. may be used to wet the $N_2$ gas and mixed gas, etc. In this case, the temperature of the water is preferably about 0 to 75° C. Also, the binder removal processing, firing and heat processing may be performed consecutively or independently. When performing these consecutively, preferably, after the binder removal processing, the atmosphere is changed without cooling, then the temperature is raised to the holding temperature for firing, the firing is performed, then cooled, and the atmosphere is changed when the holding temperature of the heat processing is reached, and then the heat processing is performed. On the other hand, when performing these independently, at the time of firing, preferably the temperature is raised to the holding temperature at the time of the binder removal processing in an $N_2$ gas or wet $N_2$ gas atmosphere, then the atmosphere is changed and the temperature is further raised. After the temperature is cooled to the holding temperature at the time of the heat processing, the atmosphere is changed again to $N_2$ gas or wet $N_2$ gas atmosphere and the cooling continues. Further, at the time of annealing, the temperature may be raised to the holding temperature in an $N_2$ gas atmosphere, then the atmosphere changed or the entire annealing process may be performed in a wet $N_2$ gas atmosphere.

The thus obtained sintered body (element body 10) is, for example, end polished, for example, using barrel polishing or sandblasting etc., then an external electrode paste is fired thereon to form the external electrodes 4. The firing conditions of the external electrode paste are for example preferably 600 to 800° C. for 10 minutes to 1 hour or so in a wet mixed gas of $N_2$ and $H_2$. Further, in accordance with need, the surfaces of the external electrodes 4 may be subjected to plating, etc. to form a pad layer. Note that the external electrode paste may be prepared in the same way as preparing the above internal electrode paste.

The thus produced multilayer ceramic capacitor of the present invention is mounted on a print substrate, etc. by soldering, etc. and used in a variety of electric devices, etc.

In the present embodiment, by optimizing the dielectric composition, the firing conditions and heat processing conditions after firing, even if the thickness of the dielectric layer is less than 3 μm and the particle diameter is larger than the dielectric thickness, sufficient insulation resistance can be obtained.

Note that the present invention is not limited to the above embodiments and a variety of modifications can be made within the scope of claims of the present invention.

Below, the present invention will be explained based on further detailed examples, but the present invention is not limited to this examples.

EXAMPLE 1

As starting materials, $BaTiO_3$ and $BaZrO_3$ produced by liquid phase synthesis method were used. Note that an average particle diameter of the $BaTiO_3$ and $BaZrO_3$ was 0.5 μm and the largest particle diameter was 1.5 μm. The composition of the main composition was set to be as indicated in the formula below.

Namely, the main composition is $Ba_{1.005}(Ti_{0.81}Zr_{0.19})O_3$. With respect to the main composition, 0.20 wt % of $MnCO_3$, 0.30 wt % of $Y_2O_3$, 0.04 wt % of $V_2O_5$, 0.05 wt % of $WO_3$ and 0.2 wt % of $SiO_2$ (an average particle diameter is 1.0 μm and the largest particle diameter is 3.3 μm in the entire additives) are respectively wet-mixed by using a ball-mill for 16 hours to obtain dielectric materials. The thus obtained dielectric materials in a blending ratio described below are mixed by using zirconia ball-mill, made to be slurry and to be a dielectric layer paste. Namely, the blending ratio is 100 parts by weight of dielectric material, 5.0 parts by weight of acrylic resin, 2.5 parts by weight of phthalic acid benzyl butyl, 6.5 parts by weight of mineral spirits, 4.0 parts by weight of acetone, 20.5 parts by weight of trichloroethane and 41.5 parts by weight of methylene chloride.

Next, the materials in the blending ratio described below were kneeled by using a three-roll, made to be slurry and to be an internal electrode paste. Namely, 44.6 parts by weight of Ni, 52 parts by weight of terpionel, 3 parts by weight of ethyl cellulose and 0.4 parts by weight of benzotriazol were blended. These pastes were used for producing the multilayer ceramic chip capacitor 1 shown in FIG. 1 in the following way.

First, the dielectric layer paste was used for forming a sheet having a thickness of 3.5 μm on a carrier film by using a doctor blade method, etc. and the internal electrode paste was used for printing an internal electrode pattern thereon. Then, the above sheet is peeled from the carrier film, a plurality of sheets on which the internal electrode is printed are stacked and adhered by pressure. Note that the number of stacked layers was 100 in the dielectric layer 2. Next, after cutting the stacked body into a predetermined size, the binder removal processing, firing and heat processing were consecutively performed under the following conditions.

Binder Removal Processing

Rate of temperature rise: 20° C./hour

Holding temperature: 300° C.

Temperature holding time: 2 hours

Atmospheric gas: in the air

Firing

Rate of temperature rise: 200° C./hour

Holding temperature: 1150° C.

Temperature holding time: 2 hours

Cooling rate: 300° C./hour

Atmospheric gas: a wet mixed gas of $N_2$ and $H_2$

Oxygen partial Pressure: 10 Pa

Heat Processing

Holding temperature: 1100° C.

Temperature holding time: 3 hours

Cooling rate: 300° C./hour

Atmospheric gas: a wet gas of $N_2$

Oxygen partial Pressure: $10^{-2}$ Pa

Note that a wetter is used to wet the respective atmospheric gases and the temperature of the water was 0 to 75° C.

After polishing the end surface of the thus obtained sintered body by sandblasting, an In—Ga alloy is applied to form a test-use electrode. A size of the multilayer capacitor produced in this way was 3.2 mm×2.5 mm×1.6 mm, the thickness of the dielectric layer 2 was 2.3 μm and the thickness of the internal electrode layer 3 was 1.5 μm.

Samples of the multilayer capacitor of the present example were measured as below.

Measurement was conducted after 24 hours left after one hour of heat processing at 150° C. to measure the initial characteristics. An impedance analyzer (HP4284A) was used for measure capacitance and loss coefficient at 1 KHz and 1V. The insulation resistance was measured by using a high ohm-meter R8340 under a condition of 10V. Also, an average particle diameter of the dielectric particles was observed as described below.

The multilayer ceramic capacitor was cut by a section vertical to the internal electrode which passes both terminal electrodes, the section was polished, and the polished section was observed by microscope. At the center portion between the internal electrode layers on the polished section, a straight line H (refer to FIG. 2) was drawn in parallel with the internal electrode layers. When assuming that the number of particles crossing with the line H was n and the length of the line was L, L/n was considered as the particle diameter (R) in the direction horizontal to the internal electrode layers.

Measurement results of the average particle diameter (R) of the dielectric particles, the ratio (R/d) between the average particle diameter and the dielectric layer thickness d, capacitance (C/V) per a unit volume and product (CR) of the capacitance and insulation resistance are shown in Table 1.

TABLE 1

|  | firing temperature | dielectric layer thickness d (μm) | average particle diameter R (μm) | R/d | C/V (F/m³) | CR (MΩμF) |
|---|---|---|---|---|---|---|
| example 1 | 1150° C. | 2.3 | 3 | 1.3 | 375 | 4620 |
| example 2 | 1100° C. | 2.3 | 2.5 | 1.09 | 363 | 5350 |
| example 3 | 1200° C. | 4.2 | 5.4 | 1.29 | 143 | 2800 |
| example 4 | 1150° C. | 4.2 | 4.5 | 1.07 | 129 | 3120 |
| comparative example 1 | 1125° C. | 4.2 | 4.2 | 1 | 98 | 3230 |
| comparative example 2 | 1100° C. | 4.2 | 3.8 | 0.9 | 93 | 3450 |
| example 5 | 1200° C. | 5.8 | 6 | 1.03 | 75 | 2170 |
| comparative example 3 | 1150° C. | 5.8 | 4.5 | 0.78 | 69 | 2500 |
| comparative example 4 | 1100° C. | 5.8 | 3.8 | 0.66 | 59 | 3030 |

EXAMPLE 2

As shown in Table 1, a sample of a capacitor was prepared in the same way as in the example 1 except that the firing temperature was made to be 1100° C., and results of the same measurement is shown in Table 1.

EXAMPLE 3

As shown in Table 1, a sample of a capacitor was prepared in the same way as in the example 1 except that the firing temperature was made to be 1200° C. and that the dielectric layer thickness was made to be 4.2 μm, and results of the same measurement is shown in Table 1.

EXAMPLE 4

As shown in Table 1, a sample of a capacitor was prepared in the same way as in the example 1 except that the firing temperature was made to be 1150° C. and that the dielectric layer thickness was made to be 4.2 μm, and results of the same measurement is shown in Table 1.

As shown in Table 1, a sample of a capacitor was prepared in the same way as in the example 1 except that the firing temperature was made to be 1200° C. and that the dielectric layer thickness was made to be 5.8 μm, and results of the same measurement is shown in Table 1.

COMPARATIVE EXAMPLE 1

As shown in Table 1, a sample of a capacitor was prepared in the same way as in the example 1 except that the firing temperature was made to be 1125° C., the heat processing temperature after firing was made to be 1000° C., the oxygen partial pressure at the time of heat processing was made to be $10^{-2}$ Pa, and the dielectric layer thickness was made to be 4.2 μm, and results of the same measurement is shown in Table 1.

COMPARATIVE EXAMPLE 2

As shown in Table 1, a sample of a capacitor was prepared in the same way as in the example 1 except that the firing temperature was made to be 1100° C., the heat processing temperature after firing was made to be 1000° C., the oxygen partial pressure at the time of heat processing was made to be $10^{-2}$ Pa, and the dielectric layer thickness was made to be 4.2 μm, and results of the same measurement is shown in Table 1.

COMPARATIVE EXAMPLE 3

As shown in Table 1, a sample of a capacitor was prepared in the same way as in the example 1 except that the firing temperature was made to be 1150° C., the heat processing temperature after firing was made to be 1000° C., the oxygen partial pressure at the time of heat processing was made to be $10^{-2}$ Pa, and the dielectric layer thickness was made to be 5.8 μm, and results of the same measurement is shown in Table 1.

COMPARATIVE EXAMPLE 4

As shown in Table 1, a sample of a capacitor was prepared in the same way as in the example 1 except that the firing temperature was made to be 1100° C., the heat processing temperature after firing was made to be 1000° C., the oxygen partial pressure at the time of heat processing was made to be $10^{-2}$ Pa, and the dielectric layer thickness was made to be 5.8 μm, and results of the same measurement is shown in Table 1.

Evaluation

As is known from comparing the examples 1 to 5 and comparative examples 1 to 4, when the average particle diameter R in the direction parallel with the internal electrode layers is larger than the dielectric layer thickness d in the dielectric particles (R/d>1), it was confirmed that a highly reliable multilayer ceramic capacitor wherein capacitance per unit volume (C/V) is large having a large capacitance even in a compact size can be realized.

Also, as shown in the examples 1 and 2, it was confirmed even if the dielectric layer thickness d is less than 3 μm, a capacitance of a high volume ratio of 100 F/m$^3$ or more can be obtained by the structure wherein the largest particle diameter of the particles is larger than a distance between electrodes. Furthermore, as shown in the examples 1 to 5, it was confirmed that by performing heat processing under an optimal oxygen partial pressure after firing in a reducing atmosphere, a sufficient CR product can be obtained, a sufficient insulation resistance R can be attained and the reliability improves.

What is claimed is:

1. A multilayer ceramic capacitor comprising:
    internal electrode layers; and
    dielectric layers, the dielectric layers comprising particles, wherein an average particle diameter (R), in a direction parallel with said internal electrode layers, is larger than a thickness (d) of said dielectric layer, wherein a ratio (R/d) between said average particle diameter (R) and the thickness (d) of said dielectric layer satisfies 1<R/d<3, wherein the thickness (d) of said dielectric layer is less than 3 μm, and wherein the internal electrode layers are separated by a distance of no more than the size of at least one particle of said particles, wherein at least one of said dielectric layers comprises at least said dielectric particles and a grain boundary phase, and an area ratio of said grain boundary phase in a section of said dielectric layer is 2% or less.

2. The multilayer ceramic capacitor as set forth in claim 1, wherein a main component of said internal electrode layers is Ni or Cu.

3. The multilayer ceramic capacitor as set forth in claim 2, wherein Fe is segregated in at least one of said internal electrode layers.

4. A multilayer ceramic capacitor comprising:
    internal electrode layers; and
    dielectric layers, the dielectric layers comprising particles, wherein an average particle diameter (R), in a direction parallel with said internal electrode layers, is larger than a thickness (d) of said dielectric layer, wherein a ratio (R/d) between said average particle diameter (R) and the thickness (d) of said dielectric layer satisfies 1<R/d<3, wherein the thickness (d) of said dielectric layer is less than 3 μm, and wherein the internal electrode layers are separated by a distance of no more than the size of at least one particle of said particles, wherein said dielectric particles have a core-shell structure.

5. The multilayer ceramic capacitor as set forth in claim 4, wherein a main component of said internal electrode layers is Ni or Cu.

6. The multilayer ceramic capacitor as set forth in claim 5, wherein Fe is segregated in at least one of said internal electrode layers.

7. A multilayer ceramic capacitor comprising:
    internal electrode layers; and
    dielectric layers, the dielectric layers comprising particles, wherein an average particle diameter (R), in a direction parallel with said internal electrode layers, is larger than a thickness (d) of said dielectric layer, wherein a ratio (R/d) between said average particle diameter (R) and the thickness (d) of said dielectric layer satisfies 1<R/d<3, wherein the thickness (d) of said dielectric layer is less than 3 μm, and wherein the internal electrode layers are separated by a distance of no more than the size of at least one particle of said particles, wherein at least one of said dielectric layers is comprised of dielectric particles, a grain boundary and grain boundary phase, a segregation phase exists in said grain boundary phase, and said segregation phase contains at least two kinds of elements selected from the group consisting of Mn, Y, Si, Ca, V and W.

8. The multilayer ceramic capacitor as set forth in claim 7, wherein a main component of said internal electrode layers is Ni or Cu.

9. The multilayer ceramic capacitor as set forth in claim 8, wherein Fe is segregated in at least one of said internal electrode layers.

* * * * *